(12) United States Patent
Owen et al.

(10) Patent No.: US 10,346,904 B2
(45) Date of Patent: Jul. 9, 2019

(54) APPARATUS AND METHOD FOR GENERATING A DATASET FOR ITEMS OF CURRENCY

(75) Inventors: Gareth Owen, Oldham (GB); David Bellis, Oldham (GB)

(73) Assignee: Innovative Technology Limited, Oldham (GB)

( * ) Notice: Subject to any disclaimer, the term of this patent is extended or adjusted under 35 U.S.C. 154(b) by 640 days.

(21) Appl. No.: 13/940,366

(22) PCT Filed: Jan. 18, 2012

(86) PCT No.: PCT/GB2012/050101
§ 371 (c)(1),
(2), (4) Date: Oct. 4, 2013

(87) PCT Pub. No.: WO2012/098393
PCT Pub. Date: Jul. 26, 2012

(65) Prior Publication Data
US 2014/0019321 A1    Jan. 16, 2014

(30) Foreign Application Priority Data
Jan. 18, 2011  (GB) .................................. 1100803.4

(51) Int. Cl.
*G06Q 40/02*  (2012.01)
*G07D 11/28*  (2019.01)

(52) U.S. Cl.
CPC .............. *G06Q 40/02* (2013.01); *G07D 11/28* (2019.01)

(58) Field of Classification Search
USPC ................ 382/135, 165, 137, 182; 194/302;
705/35, 40, 39, 41, 26, 44, 37, 38;
700/215, 214; 348/131; 358/462
See application file for complete search history.

(56) References Cited

U.S. PATENT DOCUMENTS

| | | | | |
|---|---|---|---|---|
| 5,295,796 A | * | 3/1994 | Goto | ........................ F04B 1/324 417/222.1 |
| 6,438,262 B1 | * | 8/2002 | Bernardini | ............... G07D 7/00 382/135 |
| 2003/0118228 A1 | * | 6/2003 | Mennie | .................. G07D 7/162 382/135 |
| 2003/0220795 A1 | * | 11/2003 | Arayasantiparb | ..... G06F 17/278 704/275 |

(Continued)

FOREIGN PATENT DOCUMENTS

| | | |
|---|---|---|
| DE | 10107344 | 10/2001 |
| DE | 10241149 | 3/2004 |

(Continued)

*Primary Examiner* — Tien C Nguyen
(74) *Attorney, Agent, or Firm* — Woodard Emhardt Henry Reeves & Wagner LLP

(57) ABSTRACT

The invention relates to a method, system and apparatus to allow the collection of data relating to at least one parameter of an item of currency and which data can be used to generate a new or updated dataset for the same and which can be used by validation apparatus for said items of currency. The collected data is transmitted from a location which is remote from that at which the new data set is generated and the new dataset is transmitted to the said remote location and/or other locations so as to allow the new or updated dataset to be used by the apparatus.

15 Claims, 1 Drawing Sheet

(56) References Cited

U.S. PATENT DOCUMENTS

| | | | |
|---|---|---|---|
| 2003/0236589 A1* | 12/2003 | Myatt | G07D 11/0087 700/223 |
| 2004/0050652 A1* | 3/2004 | Voser | G07D 5/00 194/302 |
| 2004/0222283 A1 | 11/2004 | Mastie et al. | |
| 2007/0110276 A1* | 5/2007 | O'Connell | B07C 3/00 382/101 |
| 2009/0242627 A1* | 10/2009 | Reinisch | G07D 11/30 235/379 |
| 2010/0131374 A1* | 5/2010 | Sanders | G06Q 20/20 705/16 |
| 2010/0135567 A1* | 6/2010 | Bang | G07D 7/162 382/135 |
| 2010/0168902 A1* | 7/2010 | Mizushima | G07D 11/24 700/214 |
| 2010/0181333 A1* | 7/2010 | Mizushima | G07D 11/24 221/1 |
| 2011/0172808 A1* | 7/2011 | Fu | G07D 11/30 700/215 |
| 2011/0206265 A1* | 8/2011 | Numata | G06Q 20/389 382/135 |
| 2012/0020543 A1* | 1/2012 | Shih | G07D 7/0033 382/135 |
| 2012/0206265 A1* | 8/2012 | Solazzo | A61F 13/42 340/573.5 |
| 2012/0243056 A1* | 9/2012 | Yamaguchi | G07D 11/32 358/462 |
| 2013/0046407 A1* | 2/2013 | Tomizawa | G07F 19/202 700/215 |

FOREIGN PATENT DOCUMENTS

| | | |
|---|---|---|
| JP | 2004070380 | 3/2004 |
| JP | 2010257338 | 11/2010 |
| WO | WO2007/110276 | 10/2007 |
| WO | WO2012/098393 | 7/2012 |

* cited by examiner

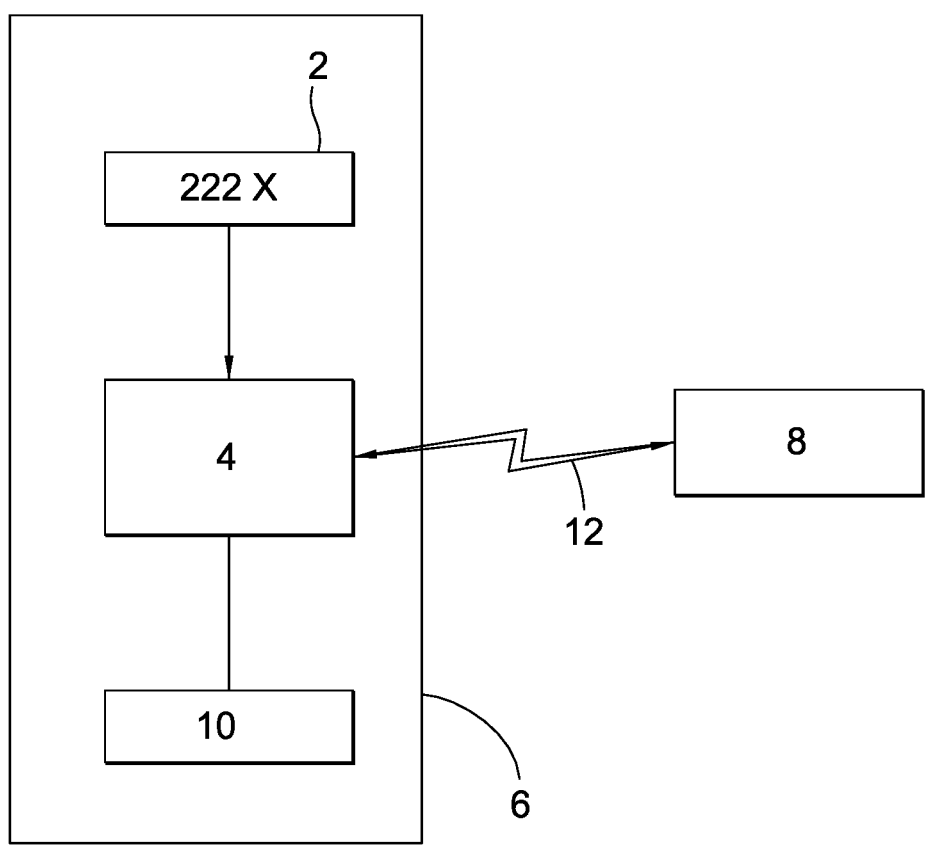

_US 10,346,904 B2_

APPARATUS AND METHOD FOR GENERATING A DATASET FOR ITEMS OF CURRENCY

BACKGROUND

The invention to which this application relates is a system for the generation of a set of criteria which relate to the recognition and validation of instruments of value such as banknotes, coins, printed tickets and electronic currency cards, hereinafter all referred to as items of currency.

While there is a need to be able to prevent fraud and also to allocate an appropriate monetary value to an input item of currency by using the criteria in the data set, it is found that in practice, valid currency may from time to time be rejected by the apparatus even though they are genuine. This can be because the currency is worn or is used in particular environments which cause a change in condition of at least one of the parameters of the currency, even though the currency itself is valid. It is found that if, for example, an item of currency is used in a first environment which is common to a particular geographical location, the parameter for that item of currency may differ from those of the same item of currency which is used in a different environment or a different geographical area. Hence the input of a genuine item of currency into apparatus located in a different geographical area could cause the rejection of that item of currency incorrectly unless the datasets for those differ accordingly to reflect this. This can lead to frustration both to the person using the apparatus and, furthermore, to the operator of the apparatus who may, over time, lose funds because of the inability to accept valid items of currency.

Furthermore, the parameters of an item of currency may change over time with increased usage such that an item of currency, which may be accepted initially, may subsequently be rejected by the apparatus as the parameters of the same change with regard to the dataset which has been generated.

In a further feature of the conventional system, the datasets are typically generated by the manufacturer of the apparatus at the location at which the apparatus is manufactured or a dedicated data processing site operated by the manufacturer. The manufacturer will typically receive a plurality of samples of the item of currency, which are to be used at the geographical location where the apparatus is to be installed. The samples may include worn or new or any combination of items of currency and also the items of currency of different monetary values which are to be accepted and/or rejected by the apparatus. The manufacturer will then analyse these items of currency and generate a dataset which is then input into the apparatus control means prior to, or at the time of installation. It is often found that after the initial dataset has been generated, the subsequent use of the apparatus in the particular location, may give rise to a need to change one or more of the criteria of the dataset. Conventionally, this requires the operator of the apparatus to send one or more items of currency to the manufacturer and have the manufacturer then alter the dataset accordingly and then retransmit the same to the apparatus operator. This can be problematic to the operator of the apparatus and can take a significant period of time during which the apparatus may not be operating correctly.

SUMMARY

The aim of the present invention is therefore to provide a means of improving the generation and/or subsequent adaptation of data which represents a plurality of criteria of one or more items of currency which are desired to be accepted or rejected by a currency validation apparatus.

Disclosed is a system for the generation of a set of criteria which relate to the recognition and validation of instruments of value such as banknotes, coins, printed tickets and electronic currency cards, hereinafter all referred to as items of currency. A specific range of currency is required to be accepted, or registered by a group of currency handling apparatus, hereinafter referred to as validators.

Such a set of criteria which may be represented electronically or implemented in software is hereinafter referred to as a dataset. The function of the dataset is to be able to firstly identify the particular currency which has been placed into the apparatus, determine the value of this currency which should be allocated and also determine that the currency is in fact valid and is not a counterfeit, this function is hereinafter known as validation. Within this document the term manufacturer refers to the manufacturer of apparatus whilst the term operator refers to the operator of that apparatus, the owner and/or authorised person with access to the apparatus.

Typically each item of currency passed into an automated handling apparatus is required to be represented by and be identifiable by a plurality of parameters, generated by software/electronic sensing within the apparatus, hereinafter referred to as data. If the data obtained from an item of currency which is input meets the criteria stored in the dataset for that particular form of currency then it will be accepted into the apparatus and a payment equivalent to the monetary value of the currency is deemed to have been made. If the currency does not meet the criteria stored in the dataset, the currency will be rejected and returned to the person who input the same into the apparatus.

BRIEF DESCRIPTION OF THE DRAWINGS

FIG. 1 is a schematic diagram illustrating components of one example of an apparatus for generating a dataset for items of currency as disclosed in detail herein elsewhere.

DETAILED DESCRIPTION

In a first aspect of the invention, there is provided a method of generating data representative of one or more parameters of at least one item of currency which, if valid, is to be accepted by currency handling and validation apparatus, said method comprising the steps of obtaining data relating to one or more parameters of said at least one item of currency, processing the data into a form to represent a dataset for the at least one item of currency which is to be accepted and/or registered by the said apparatus, and wherein the generation of the data representative of the said one or more parameters is performed at a location which is remote from that at which the dataset is generated and communication means are provided to allow the communication of data from the said remote location to the location at which the dataset is generated.

In one embodiment the data is obtained by placing one or more of said items of currency through apparatus to identify data relating to at least one parameter of the item of currency.

In one embodiment the said location is that at which an original dataset for the item of currency is held in memory.

In one embodiment, the data communication means is also used to transfer the newly generated dataset back to the apparatus at the said remote location to allow the newly generated dataset to be used as the reference dataset for ongoing operation of the apparatus.

In one embodiment, the newly generated dataset can be the first dataset for a particular item of currency to be accepted by the apparatus or, and more typically, the newly generated dataset is an update of a previous dataset installed in the apparatus.

Typically, the update to the dataset which is achieved by generating the newly generated dataset, is done to take into account a particular feature or parameter characteristic of the one or more items of currency which are passed through validation means at the remote location. Typically, the one or more characteristics can be items of currency which have been worn or are relatively old, items of currency which have been used in a particular environment and therefore may have particular features relating to that environment or are counterfeit items of currency which should be rejected.

Typically the apparatus provided at the remote location, is the currency validation device for which the dataset is to be generated, which may be provided with additional means to detect the necessary parameters and to allow the data to be communicated to the site at which the dataset is generated.

In one embodiment, the operator of the apparatus is provided with a means to access the original dataset at the time of installation of the apparatus and, over time, the operator can thereafter select for a newly generated set of data to be used. At that time, they can input into the currency validation device provided at any location or environment selected by the operator, one or more items of currency and the data representative of those items of currency is transferred by data communication means to a location, typically that of the apparatus manufacturer, in order to allow the apparatus manufacturer to access the new data and generate a new dataset. This new dataset can then be stored and allocated to particular apparatus and/or a particular geographical location and transferred to the operator of the said apparatus by a data communication means to allow them to upgrade the dataset within the currency validation apparatus or all the currency validation devices pertaining to the apparatus and dataset and refer to the newly generated dataset.

Typically, the newly generated dataset will be more accurately directed towards the form of the items of currency which are used at the particular location and/or environment of the apparatus at that time and thereby reduce the level of rejection of valid items of currency and/or allow the rejection of invalid items of currency.

In one embodiment, the input of the item of currency which is to be referred to in the generation of the new dataset, is selected by the operator of the apparatus as will the time of the input. This therefore means that the operator can input items of currency to be used to change the dataset at any time when they identify that there is a particular problem with particular items of currency items in the operation of the apparatus and/or changes are made to the items of currency themselves. Furthermore, the operator does not need to send the items of currency physically to the location at which the dataset was or is generated which greatly improves the efficiency and speed by which the change or generation of datasets can be made.

Thus, in accordance with the present invention, the operators of apparatus in all parts of the world, can add or change information relating to particular items of currency themselves at their location and add or remove data from or to the database used to generate the dataset for the apparatus which is operated by the operator.

In one embodiment the false rejection of items of currency is eliminated and also allows the addition of new details relating to acceptable items of currency to the dataset so as to improve a level of acceptance of genuine items of currency.

In one embodiment, the operator of the apparatus is provided with a step by step guide to be followed when they wish to enter details relating to a particular item of currency to allow the dataset to be changed. Typically the guidance is provided on a display screen in conjunction with the apparatus used to input the items of currency.

In one aspect of the invention there is a system to collect data relating to the characteristics of at least one parameter of an item of currency at a location remote from that at which an existing dataset for the said item of currency is stored and at which location said datasets are generated, wherein said system includes means to collect data for the item of currency to which the said dataset relates at the said remote location, communication means which allow the collected data to be transmitted to the location of dataset storage and/or processing and at which a new dataset for the item of currency is generated and communication means to allow the return of the newly generated dataset to the said remote location and/or other locations for use.

Typically the data that has been collected in a location or environment other than that of the data storage or processing centre may be used to generate one or more datasets available for use in locations or environments other than that in which the data was collected.

In a further aspect of the invention there is provided apparatus for use in the collection of data relating to at least one parameter of an item of currency, said apparatus including means to accept the input of an item of currency and validation means to determine whether or not the item of currency is valid for acceptance with reference to an existing dataset for that item of currency, means to accept the item of currency if valid and refuse the item of currency if invalid and wherein means are provided to allow data relating to at least one parameter of the input item of currency to be collected by the apparatus.

In one embodiment the apparatus includes communication means to allow said collected data to be transmitted to a remote location.

In one embodiment a display screen is provided with, or in communication with, said apparatus to provide the operator of the apparatus with a guide to be followed when they wish to enter details relating to a particular item of currency to allow the data to be collected therefore.

A specific embodiment of the invention is now described with reference to the accompanying diagram which shows steps followed in accordance with one embodiment of the invention.

Conventionally, when currency validating units are dedicated to a particular currency, many of the items of currency have to be inserted to ensure that any variations in the same that may occur normally but which may still be allowable, and which are referred to as data signatures, are included in the dataset used for dedicating the apparatus to each denomination of the currency.

From time to time, the currency control organisation such as governments or combined government bodies, introduce new issues and/or denominations of items of currency in which case a large quantity of items of currency need to be collected and shipped to a remote destination at which there is provided a relatively high powered computing system that is used to store the information relating to the new currency and process said data in order to generate a new dataset that can then be downloaded into each unit of apparatus in that particular geographical location where the new currency denominations are to be used. In addition or alternatively, items of currency can also change in terms of characteristics over time of use so that overtime, many valid items of currency may in fact no longer be accepted by the apparatus if the parameters of the items of currency have changed beyond that which is set as being acceptable in the dataset. It is also difficult in some countries to obtain a large number of relevant items of currency in order to create a database, remotely or alternatively, it is not allowed to take sufficient items of currency out of the country to allow them to be assessed and for the dataset to be generated at a remote location. Also, the time taken to generate the new dataset can be frustrating to operators of the apparatus as the problem which has caused the new dataset to be generated will continue to occur until the new dataset is actually provided to them. Furthermore, if the problem is of fraudulent use then a relatively large amount of money can be lost by the operators of the apparatus if such fraudulent use cannot be stopped until the new dataset is generated to eliminate the fraud.

In accordance with one embodiment of the invention, there is provided the ability of operators of the apparatus in all parts of the world, to be able to generate data representative of new items of currency or existing items of currency themselves and then transfer that information to a location at which the new dataset can be generated. This therefore avoids the need for the items of currency to be physically moved and transported to the location at which the dataset is generated.

In accordance with the invention, one example of which is illustrated in FIG. 1, the operator of the apparatus may be issued with an access code (2) which allows access to a data communication system (4) at the remote location (6). This system is linked to a relatively high powered computer system (8) at which the original dataset for the particular apparatus is stored. The operator can then, at their own location (6), input one or a number of the required items of currency into the currency validation apparatus (10). The operator is also asked to identify whether the items of currency which they are inputting at that time, should represent items of currency which should be accepted by the apparatus or items of currency which are fraudulent and therefore should not be accepted by the apparatus. The data representative of the items of currency which are input at that location, is then transmitted via data communication means (12) to the relatively high powered computing system (8) at a remote location, usually at the manufacturer of the currency validation apparatus. At that stage, the new data is stored, electronically or otherwise, and may be assessed for compatibility with the present dataset. If no problems arise, the new data will be integrated into a newly created dataset file, specific to the operator of the currency validation apparatus. This new dataset may then be retransmitted via the data communication means (12) to the operator at location (6) to allow the update of the apparatus which is controlled by that operator.

The data used to generate the dataset for the operator of the currency validation apparatus and the dataset itself will then be held in storage at the location (8) and allocated to the apparatus or that operator so that if it is required in future that a new dataset is generated for that operator and/or apparatus then the most recent data and dataset will be referred to.

The data obtained from the operator of the currency validation apparatus will be held in a database at a remote location, usually the manufacturer of the currency validation apparatus, and assessed for integration into general dataset files for use with all aspects of relevant currency validation apparatus.

Thus, it will be appreciated that the methods and apparatus in accordance with the invention, allow the user of the apparatus to update the operation of the apparatus in a timely manner and therefore avoid the possibility of prolonged fraud and/or prolonged unnecessarily high rejection levels for valid items of currency.

The invention claimed is:

1. A method of modifying the operation of a currency handling apparatus, the method comprising:
passing an example currency item of a currency item of interest through a first currency handling apparatus, the first currency handling apparatus having an electronic sensing device configured to automatically detect one or more parameter values about the example currency item as it passes through, the one or more parameter values stored in the first currency handling apparatus as currency data;
transferring the currency data from the first currency handling apparatus to a remote computing system;
using the remote computing system to create an updated dataset file that includes the currency data, wherein the currency data is integrated with original currency data about the currency item of interest to create an updated dataset file;
transferring the updated dataset file from the remote computing system to a second currency handling apparatus and storing the updated dataset file therein, wherein prior to transferring the updated dataset file, the second currency handling apparatus included outdated currency data with missing or incorrect values for the one or more parameter values, and was therefore configured to incorrectly validate currency items of interest passed through the second currency handling apparatus; and
passing a currency item of the currency item of interest through the second currency handling apparatus, the second currency handling apparatus using an electronic sensing device to automatically detect the one or more parameter values about the currency item, the second currency handling apparatus correctly validating the currency item by comparing the one or more parameter values about the currency item to corresponding values in the updated dataset file.

2. The method of claim 1 wherein the remote computing system is where an original dataset for the item of currency is held in memory.

3. The method of claim 1 wherein the updated dataset file is a first dataset for a particular item of currency which is to be accepted by the one or more currency handling apparatuses.

4. The method of claim 1 wherein the updated dataset file is an update of a previous dataset installed in one or more other currency handling apparatuses.

5. The method of claim 4 wherein the previous dataset is updated to take into account a characteristic of a particular feature or parameter of the items of currency which are passed through the one or more currency handling apparatuses.

6. The method of claim 5 wherein the characteristic is any, or any combination of, the following: the item of currency is worn, the item of currency is relatively old, the item of currency is or has been used in a particular environment and therefore may have particular features relating to that environment and/or are counterfeit items of currency which should be rejected.

7. The method of claim 1 wherein an operator of a currency handling apparatus of the one or more currency handling apparatuses is provided with a means to access an original dataset when the first currency handling apparatus is installed and, over time, the operator can thereafter select to replace the original dataset with a newly generated dataset by inputting a currency item into the apparatus provided at any location or environment selected by the operator, and the data representative of those items of currency is transferred by the data communication means to a the remote computing system.

8. The method of claim 7 wherein the remote computing system is located at the apparatus manufacturer.

9. The method of claim 1 wherein the new dataset file or the first dataset file is stored in the remote computing system and allocated to particular apparatus and/or apparatus operated at a particular geographical location and transferred to the operator of the appropriate apparatus by the data communication means to allow the operator to upgrade the dataset within the appropriate currency handling apparatus.

10. The method of claim 1 wherein the new dataset file or the first dataset file is stored and allocated to particular apparatus and/or apparatus operated at a particular geographical location and transferred to the operator of the said appropriate apparatus by the data communication means to allow them to upgrade the dataset within the appropriate currency handling apparatus.

11. The method of claim 1, wherein the one or more currency handling apparatuses receiving the new updated dataset file includes the first currency handling apparatus.

12. The method of claim 1, wherein the electronic sensing device is configured to detect information about the appearance of the example currency item.

13. The method of claim 1, wherein the first currency handling apparatus includes a copy of the original dataset file, and wherein the example currency data is added to the original dataset file in the first currency handling apparatus when the example currency item is passed through the first currency handling apparatus.

14. The method of claim 1, wherein the first currency handling apparatus, and the second currency handling apparatus are the same currency handling apparatus.

15. The method of claim 1, wherein the first currency handling apparatus, and the second currency handling apparatus are different currency handling apparatuses.

* * * * *